United States Patent
Hughes et al.

(10) Patent No.: US 10,102,008 B2
(45) Date of Patent: Oct. 16, 2018

(54) MANAGED BOOT PROCESS SYSTEM

(71) Applicant: Dell Products L.P., Round Rock, TX (US)

(72) Inventors: Kevin Allen Hughes, Cedar Park, TX (US); Jason Garth Pearce, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 153 days.

(21) Appl. No.: 14/843,608

(22) Filed: Sep. 2, 2015

(65) Prior Publication Data

US 2017/0060598 A1    Mar. 2, 2017

(51) Int. Cl.
*G06F 9/44* (2018.01)
*G06F 9/4401* (2018.01)
*G06F 3/0484* (2013.01)

(52) U.S. Cl.
CPC ........ *G06F 9/4416* (2013.01); *G06F 3/04847* (2013.01)

(58) Field of Classification Search
CPC ... G06F 3/04847; G06F 9/4416; G06F 9/4401
See application file for complete search history.

(56) References Cited

U.S. PATENT DOCUMENTS

| | | | | |
|---|---|---|---|---|
| 5,390,170 A * | 2/1995 | Sawant | ............... | H04L 29/06 370/399 |
| 6,539,473 B1 * | 3/2003 | Hubacher | ............. | G06F 9/4416 709/203 |
| 6,560,706 B1 * | 5/2003 | Carbajal | ............... | G06F 21/572 713/155 |
| 6,816,964 B1 * | 11/2004 | Suzuki | ...................... | G06F 8/61 709/232 |
| 6,963,981 B1 * | 11/2005 | Bailey | ....................... | G06F 8/60 726/22 |

(Continued)

OTHER PUBLICATIONS

"Datacenter Diskless Boot Technical Preview," Feb. 29, 2012; pp. 1-2, http://technet.microsoft.com/en-us/library/hh831563.aspx.

(Continued)

*Primary Examiner* — Jaweed A Abbaszadeh
*Assistant Examiner* — Brian J Corcoran
(74) *Attorney, Agent, or Firm* — Haynes and Boone, LLP

(57) ABSTRACT

A managed boot process system includes a management device coupled to a networking device through a network. The networking device includes a storage system with an assured boot image, a plurality of runtime images, and a plurality of session data, and a memory system having boot instructions. A processing system in the networking device stores the plurality of session details in the storage system during a management session with the management device and prior to a reboot. The processing system then performs a reboot and executes the boot instructions to load the assured boot image. The networking device then uses the session details to restart the management session without reauthorization subsequent to loading the assured boot image and prior to loading a runtime image. The networking device then provides a graphical user interface over the network to the management device and uses it to receive a management instruction for execution.

20 Claims, 13 Drawing Sheets

(56) References Cited

U.S. PATENT DOCUMENTS

| | | | | |
|---|---|---|---|---|
| 7,673,131 B2* | 3/2010 | Azzarello | | G06F 9/4406 |
| | | | | 713/2 |
| 7,818,557 B2* | 10/2010 | Bestmann | | G06F 8/63 |
| | | | | 709/220 |
| 8,140,748 B2* | 3/2012 | Kacin | | G06F 9/4416 |
| | | | | 711/104 |
| 8,171,276 B2* | 5/2012 | Fried | | G06F 9/4406 |
| | | | | 713/2 |
| 8,176,306 B2* | 5/2012 | Piwonka | | G06F 11/1417 |
| | | | | 713/1 |
| 8,190,720 B1* | 5/2012 | Yellai | | H04L 67/34 |
| | | | | 709/221 |
| 8,516,237 B2 | 8/2013 | Moore et al. | | |
| 8,990,793 B1* | 3/2015 | Fong-Jones | | G06F 8/61 |
| | | | | 717/168 |
| 9,632,806 B1* | 4/2017 | Righi | | G06F 9/44505 |
| 2005/0289357 A1* | 12/2005 | Han | | G06F 21/575 |
| | | | | 713/184 |
| 2007/0226249 A1* | 9/2007 | Kacin | | G06F 9/45512 |
| 2008/0082680 A1* | 4/2008 | Grewal | | G06F 9/4416 |
| | | | | 709/232 |
| 2010/0031248 A1* | 2/2010 | Sonkin | | G06F 8/61 |
| | | | | 717/174 |
| 2010/0049840 A1* | 2/2010 | Chang | | G06F 8/65 |
| | | | | 709/221 |
| 2011/0099359 A1 | 4/2011 | O'Neil | | |
| 2014/0229930 A1* | 8/2014 | Shroni | | G06F 8/665 |
| | | | | 717/173 |
| 2014/0281455 A1 | 9/2014 | Kochar | | |
| 2014/0304497 A1* | 10/2014 | Park | | G06F 9/4406 |
| | | | | 713/2 |

OTHER PUBLICATIONS

"Super Fast Boot of Embedded Linux: 300 Milliseconds From Boot Loader to Shell on 720 MHz ARM With NAND Flash," 2011, pp. 1-3, Linux; http://www.makelinux.com/emb/fastboot/omap.

* cited by examiner

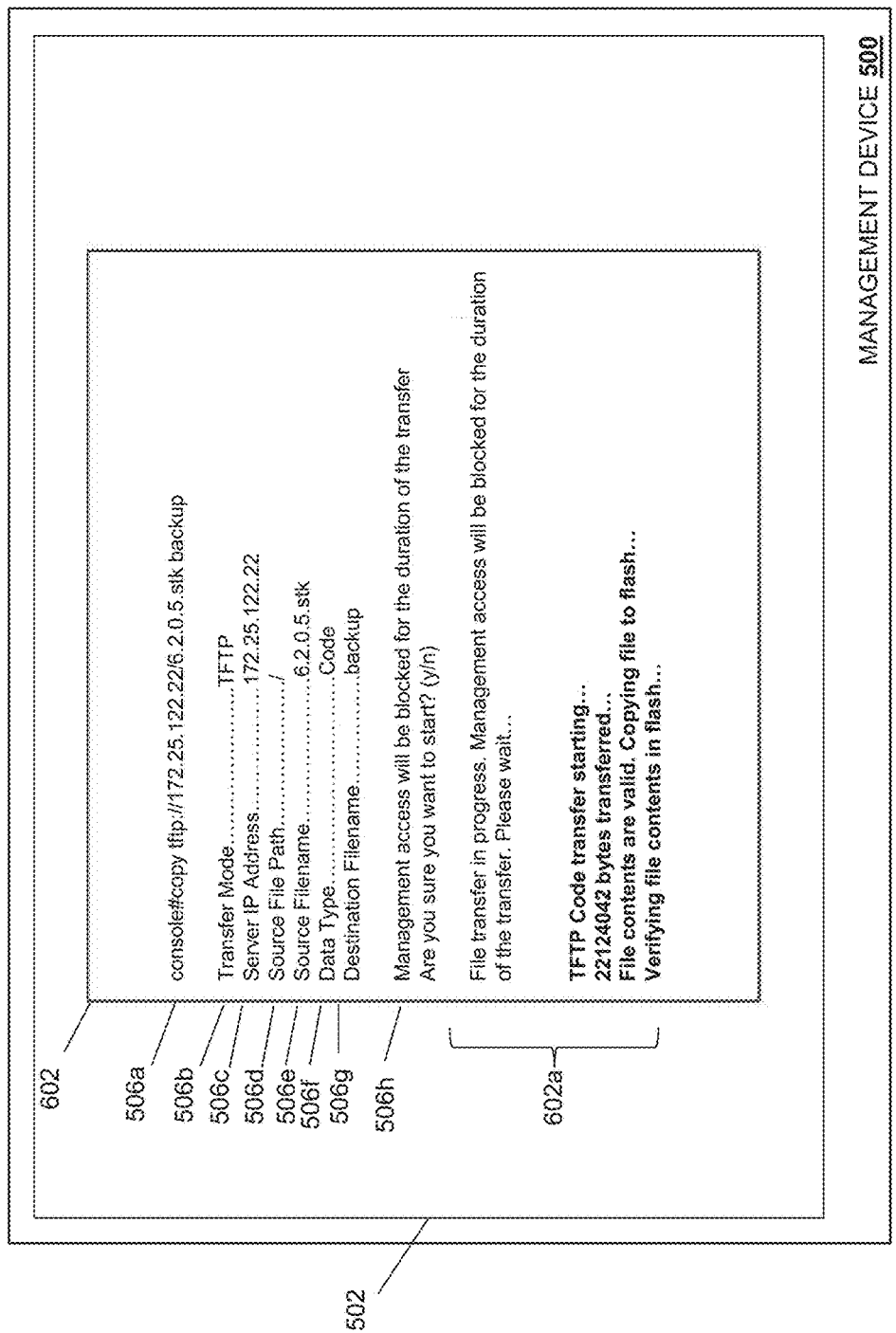

MANAGED BOOT PROCESS SYSTEM

BACKGROUND

The present disclosure relates generally to information handling systems, and more particularly to a managed boot process system for information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Most information handling systems such as, for example, switches, include a series of steps that are performed to boot up that initialize the system and load a firmware image that allows the switch to operate. Such conventional booting systems suffer from a number of problems. For example, conventional boot loader images require dedicated drivers and operating system (OS) extensions to be created and maintained. Furthermore, operations performed during the boot process may be exposed to the user without providing any user-friendly means for interacting with the boot process, and low-level boot loader arguments may be exposed to the user that are typically cryptic or unintelligible. In some situations, boot loader arguments and/or images may become corrupted or inconsistent such that boot up fails or results in errors, and the procedures for loading new code are very primitive and result in the use of file transfer protocols to provide new images on the switch, which can result in unbootable switches if a problem occurs. Finally, when a switch reboots during a remote management session, that reboot can take a relatively long time, and the remote management session requires a reauthorization by the management system to continue.

Accordingly, it would be desirable to provide a boot system that provides a user the ability to interact with the system early in the boot process rather than when (and if) that boot process is successful.

SUMMARY

According to one embodiment, an information handling system (IHS) includes a processing system; and a memory system that is coupled to the processing system and that includes instructions that, when executed by the processing system, cause the processing system to: store a plurality of session details during a management session with a management device and prior to a reboot; perform a reboot; execute boot instructions to load an assured boot image; restart the management session without reauthorization using the session details to provide a restarted management session, wherein the restarted management session is provided subsequent to loading the assured boot image and during a boot process that is performed prior to loading a runtime image; provide a graphical user interface to the management device during the restarted management session and prior to loading the runtime image; receive a management instruction through the graphical user interface from the management device during the restarted management session and prior to loading the runtime image; and execute the management instruction during the restarted management session and prior to loading the runtime image.

BRIEF DESCRIPTION OF THE DRAWINGS

FIG. 6b is a screenshot view illustrating an embodiment of a networking device management session performed on a management device prior to a networking device reboot.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
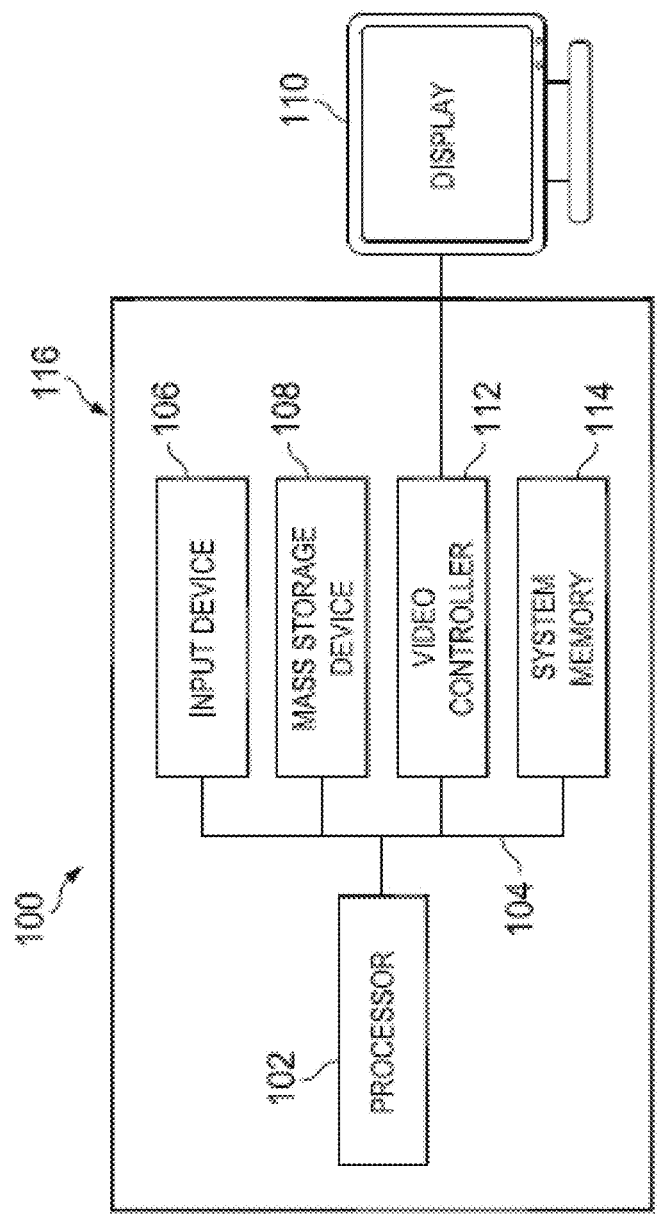
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
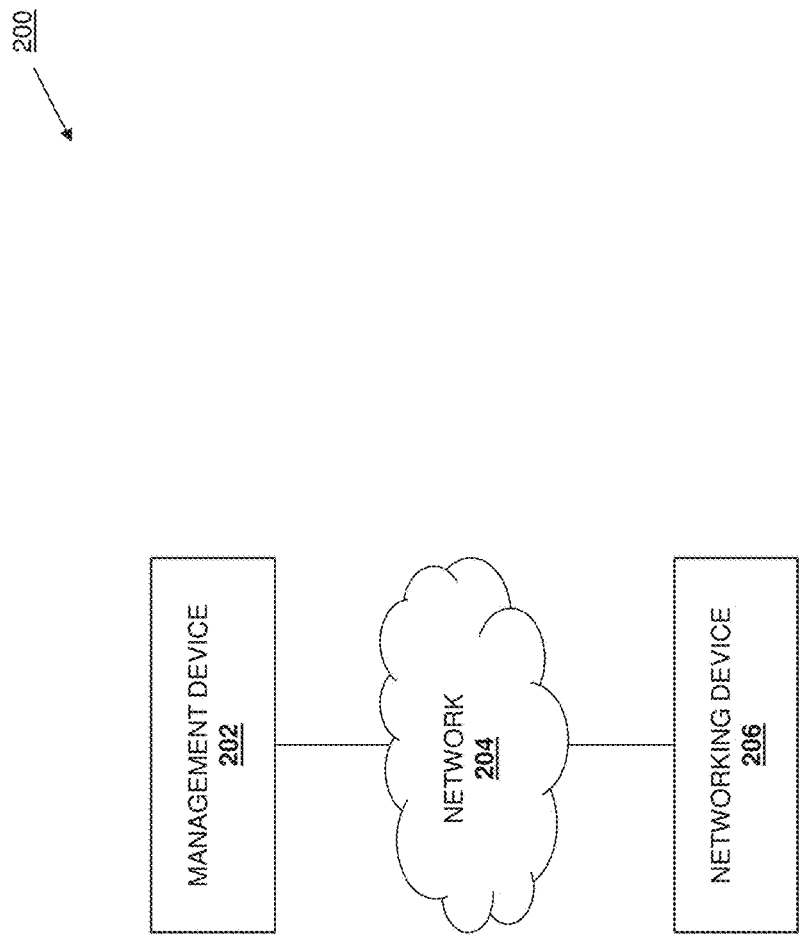
FIG. 2 is a schematic view illustrating an embodiment of a managed boot process system.

Referring now to FIG. 2, an embodiment of a managed boot process system 200 is illustrated. In the illustrated embodiment, the managed boot process system 200 includes a management device 202 that is coupled through a network 204 to a networking device 206. In an embodiment, the management device 202 and/or the networking device 206 may be the IHS discussed above with reference to FIG. 1 and/or may include some or all of the components of the IHS 100. In specific embodiments, the management device 202 is connected to the networking device 206 through a Local Area Network (LAN) (i.e., the network 204) that may provide a management network for the networking device 206. However, other networks will fall within the scope of the present disclosure. While the management device 202 is illustrated as connected to the networking device 206 through the network 204, in some embodiments the management device 202 may be directly coupled (e.g., via cabling, a direct wireless connection, and/or using other methods known in the art) to the networking device 206 while remaining within the scope of the present disclosure. Furthermore, while only one networking device has been illustrated, any number of networking devices may be coupled to the management device 202 through the network 204 (e.g., when the management device 202 provides management functionality for a datacenter) while remaining within the scope of the present disclosure. Further still, while the management device 202 is illustrated and described as providing for the management of a networking device, the management device 202 may provide for management of any of a variety of other devices including servers, storage systems, desktop computing systems, laptop computing systems, tablet computing systems, mobile phones, and/or other computing devices known in the art.

Figure 3:
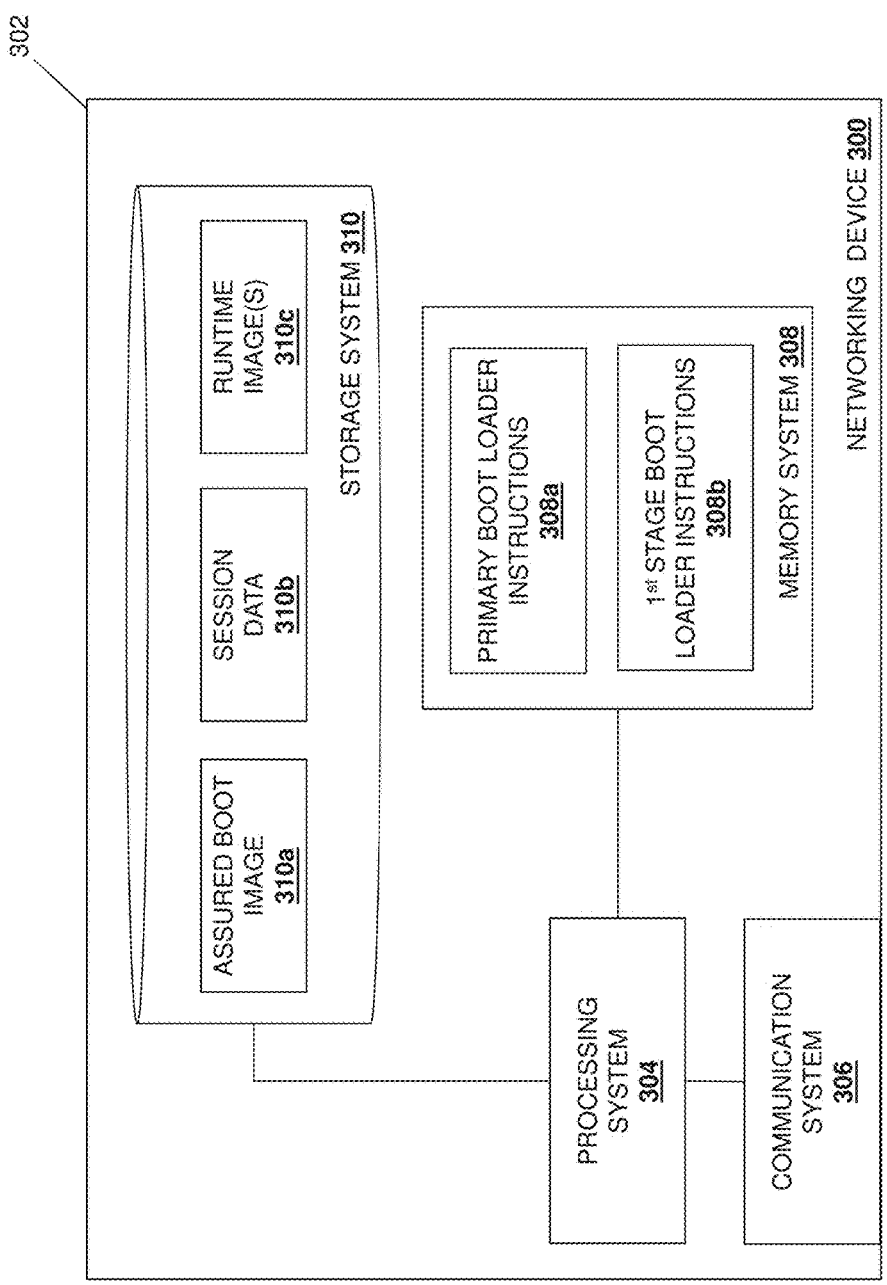
FIG. 3 is a schematic view illustrating an embodiment of a networking device used in the managed boot process system of FIG. 2.

Referring now to FIG. 3, an embodiment of a networking device 300 is illustrated. In an embodiment, the networking device 300 may be the networking device 206 discussed above with reference to FIG. 2. As such, the networking device 300 may be the IHS 100 discussed above with reference to FIG. 1 and/or may include some or all of the components of the IHS 100. In specific embodiments, the networking device 300 may be an Ethernet switch, a Fibre Channel switch, and/or a variety of other switch devices known in the art. The networking device 300 includes a chassis 302 that houses the components of the networking device 300, only some of which have been illustrated for clarity. For example, as would be understood by one of skill in the art, networking devices may include route processor modules, line modules, ports, and/or other networking components that provide for conventional networking functionality. Furthermore, as discussed above, the illustrated components of the networking device 300 may be provided in the other types of devices discussed above while remaining within the scope of the present disclosure.

In the illustrated embodiment, the chassis 302 houses a processing system 304 that may include one or more processors (e.g., the processor 102 discussed above with reference to FIG. 1, an embedded control processor, etc.). The processing system is coupled to each of a communication system 306, a memory system 308, and a storage system 310 that are housed in the chassis 302. In an embodiment, the communication system 306 may include any of a variety of communication components that allow for the coupling of the networking device 300 to the management device 202 (e.g., directly, via the network 204, etc.) For example, the communication system 306 may include a network interface controller (NIC), a wireless communication subsystem, and/or other communication components known in the art.

The memory system 308 may include any of a variety of memory devices and/or other components that allow for the storage of the instructions discussed below. In the illustrated embodiment, the memory system 308 includes primary boot loader instructions 308a may provide a simplified version of conventional primary boot loader instructions utilized in conventional boot systems. For example, the primary boot loader instructions 308a may be provided by a minimal implementation of a universal boot loader (also known as u-boot) used by embedded devices to package instructions to boot a device's operating system kernel, and the primary boot loader instructions 308a may operate to proceed directly to the kernel of the networking device 300 without user interaction, with all the parameters utilized by the primary boot loader instructions 308a being preconfigured on the networking device 300. One of skill in the art in possession of the present disclosure will recognize that the pre-configuration of the parameters utilized by the primary boot loader instructions 308a eliminates the need for maintenance of boot loader code, as that code is "pre-wired" and does not need to be configured or otherwise maintained.

In an embodiment, the memory system 308 also includes first stage boot loader instructions 308b that may provide an x-loader application that is configured as a small first-stage boot loader. For example, the first stage boot loader instructions 308b may be created from a stripped down u-boot base, and provided in static Random Access Memory (RAM) or Read Only Memory (ROM) accessible by the processing system 304. As discussed below, the first stage boot loader instructions 308b may allow for the set up clocks and memory access, followed by the ability to activate the primary boot loader instructions 308a. During a boot process for the networking device 300, the processing system 304 may execute the first stage boot loader instructions 308a to perform minimal operations from a fixed location in the memory such as setting up components including memory controllers and flash access that are fixed in the networking device 300, followed by the execution of the primary boot loader instructions 308a based on parameters passed by the first stage boot loader instructions 308b to initiate the assured boot image, discussed in further detail below. One of skill in the art in possession of the present disclosure will recognize that the primary boot loader instructions 308a and the first stage boot loader instructions 308b described above are designed to be executed by the processing system 304 very quickly and reliably such that the lightweight assured boot and the subsequently available user space, discussed below, may be accessed as quickly as possible.

The storage system 310 may include any of a variety of storage devices and/or other components that allow for the storage of the images and data discussed below. In an embodiment, the storage system 310 includes an assured boot image 310a that may be considered as a type of "golden" boot image. In specific embodiments, the assured boot image 310a may be a kernel image (e.g., a Linux kernel image) and/or other images known in the art. For example, the assured boot image 310a may be burned at the network device manufacture facility and secured in the storage system 310 such that it cannot be subsequently modified. In an embodiment, the assured boot image 310a may be provided on its own partition in the storage system 310, write protected, and/or otherwise "fenced off" in the networking device 300 such that it may not be modified by any subsystems included in or added to the networking device 300. As such, the assured boot image 310a should always successfully boot the networking device 300 to an assured boot environment and, if such a boot is unsuccessful, then it may be quickly and easily determined that the networking device 300 should be returned to the device provider for service, which allows for simplified field troubleshooting and fixed-function assessment in manufacturing. Furthermore, the original factory diagnostics for the networking device 300 may be included in the assured boot image 310a and, like the rest of the assured boot image 310a, may remain unchanged for the life of the networking device 300. For example, the assured boot image 310a may include diagnostic instructions that are executed upon the loading of the assured boot image 310a, discussed below. However, additional diagnostic functionality may be added to the networking device 300 by modules or executables in the read/write file system and accessed per user interactions while remaining within the scope of the present disclosure.

Furthermore, the initial operating system environment provided by the assured boot image 310a may be presented to the user of the networking device 300 relatively quickly (e.g., within a few seconds of powering on, resetting, and/or otherwise initializing the networking device 300), as no time may be spent during the execution of the boot loader instructions 308a and 308b waiting for user interactions and/or selections between runtime images. Rather, as discussed below, user interactions and runtime image selection may instead by be handled by the initial operating system environment provided by the assured boot image 310. One of skill in the art in possession of the present disclosure will recognize that the handling of user interactions and runtime image selection by the initial operating system environment provided by the assured boot image 310 removes one of the more onerous development efforts typically performed when providing extensive platform support in a pre-operating system boot code environment, along with removing the problematic and complex pre-operating system image management that is standard in most conventional networking device platforms. Instead, the first stage boot loader instructions 308b and the primary boot loader instructions 308a may perform the minimal operations required so that the assured boot image 310a may be loaded to provide the initial operating system environment. As described below, once the initial operating system environment is provided, user interaction during the boot process and networking device features may be provided by conventional user space programs and scripting. This immediate provisioning of a user space environment early in and during the boot process reduces the overall complexity of developing the image management system as well as the potential for errors during the networking device initialization process. Furthermore, the assured boot image 310a may provide a simplified operational mode that allows a user to manually verify basic hardware functionality. For example, an Ethernet switch may include an unmanaged 802.1b forwarding mode, while a Fibre Channel switch may include an unmanaged default-zone-enabled mode.

In an embodiment, the storage system 310 also includes session data 310b that may be received and stored during management sessions performed on the networking device 300. For example, the session data 310b may be collected during management sessions performed during the runtime of the networking device 300 and stored in a persistent file system in the storage system 310 that is accessible by the assured boot image 310a to allow for upgraded functionality once the assured boot image 310a is up and running. However, the session data may not be accessed until the assured boot image is interactively prompted to do so, or the boot time out has been reached and the scripted startup accesses it, which ensures that the fixed functionality of the assured boot image 310a is not influenced by any add-ons in the networking device 300. In an embodiment, the storage system 310 also includes one or more runtime images 310c that may be loaded on the networking device 300 per instructions from a user as discussed below. For example, the runtime image(s) 310c may include primary firmware images, backup firmware images, and/or a variety of other runtime images known in the art.

Figure 4:
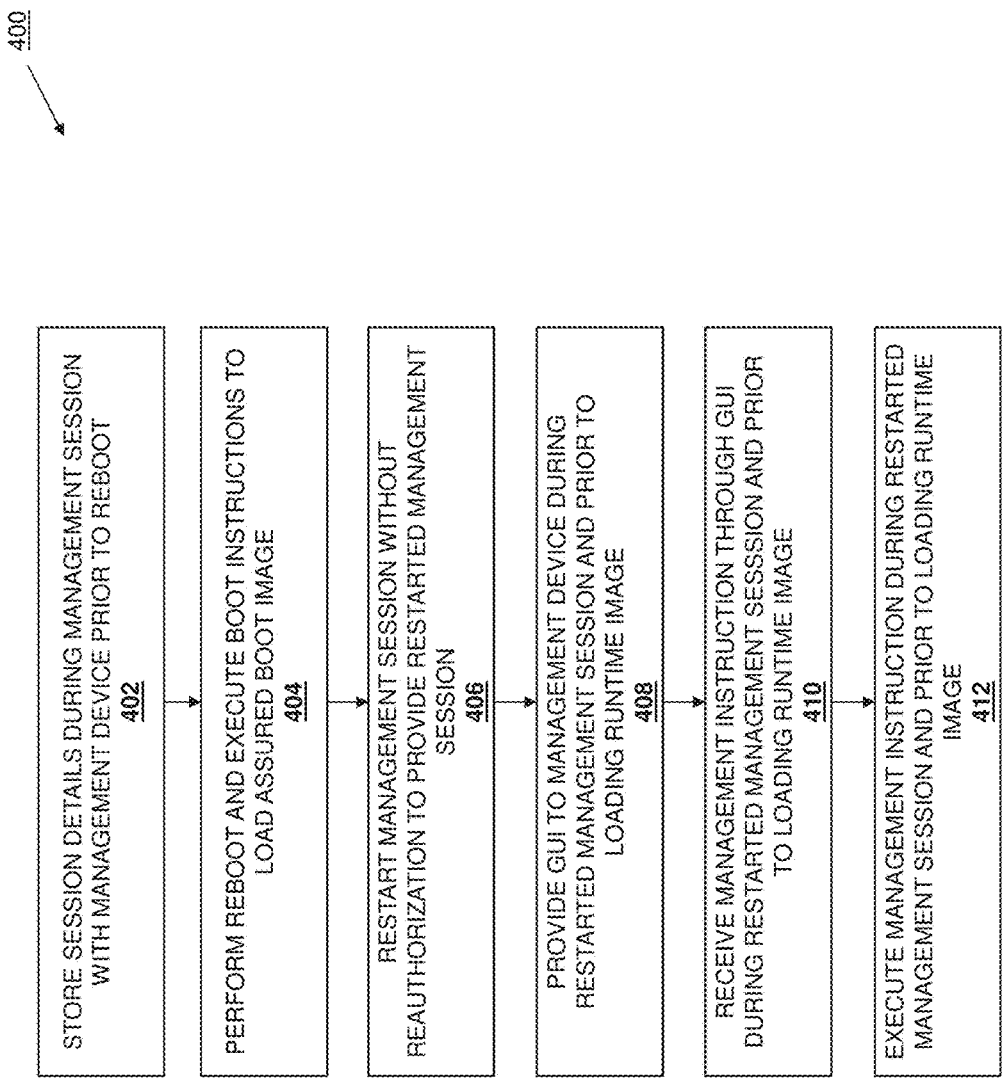
FIG. 4 is a flow chart illustrating an embodiment of a method for management during a boot process.

Referring now to FIG. 4, an embodiment of a method 400 for management during a boot process is illustrated. As discussed below, the method 400 provides for the operation of the networking device 300 via the features discussed above to keep management session data stateful and persistent, which allows internal process/thread states and data be associated with service states, management services data, and protocol sessions to be saved (e.g., as a snapshot). The combination of this persistent management session data with the initial operating system provided by the assured boot image 310a and the minimal/quick boot kernel enables higher level management interfaces (e.g., Transmission Control Protocol/Internet Protocol (TCP/IP), Telnet, Hyper-Text Transfer Protocol (HTTP), and/or other management interfaces known in the art) to be made available to the user during the early phases of the boot process, which enables a variety of management functionality that has previously been unavailable in conventional networking devices.

The method 400 begins at block 402 where session details are stored during a management session with a management device prior to reboot. In an embodiment, prior to block 402 of the method 400, a runtime image may have been loaded on the networking device 206/300 (e.g., in the manner described below) in response to a boot process such that the runtime image was made available for operating the networking device 206/300. At some point during the operation of the networking device 206/300 using that runtime image, the management device 202 may have provided (e.g., via an administrator operating the management device 202) authentication information for a management session to the networking device 206/300, and the networking device 206/300 may have authenticated that authentication information to start the management session between the management device 202 and the networking device 206/300. For example, an administrator may begin the management session with the networking device 206/300 using the management device 202 in order to load a new runtime image, modify the current runtime image, perform diagnostics, access the operating system and apply patches, and/or perform a variety of other management functions known in the art.

At block 402, during the management session with the management device 202, the processing system 304 in the networking device 300 may receive management session data through the communication system 306 and store that management session data as the session data 310b in the storage system 310. As discussed above, the session data may include a service state, management services data, protocol session data, and/or other management session information known in the art, and may be stored in a variety of manners (e.g., as a snapshot) while remaining within the scope of the present disclosure. Referring now to FIGS. 5a, 5b, 6a, 6b, 7a, and 7b, screenshots from a management device 500 are illustrated that provide embodiments of a management session from the point of view of the management device 206/500 that may be utilized by an administrator to provide the management session data at block 402. However, the screenshots in FIGS. 5a-7b include some features of conventional management sessions that cause a user to lose management access to the networking device 300 upon reboot of the networking device 300, and those conventional features are provided in order to illustrate the differences between those conventional management sessions and the management sessions provided by the systems and methods of the present disclosure. As such, those features are called out as "conventional" in the discussions below, along with a discussion of the lack of those features in systems of the present disclosure operating according to the method 400.

Figure 5A:
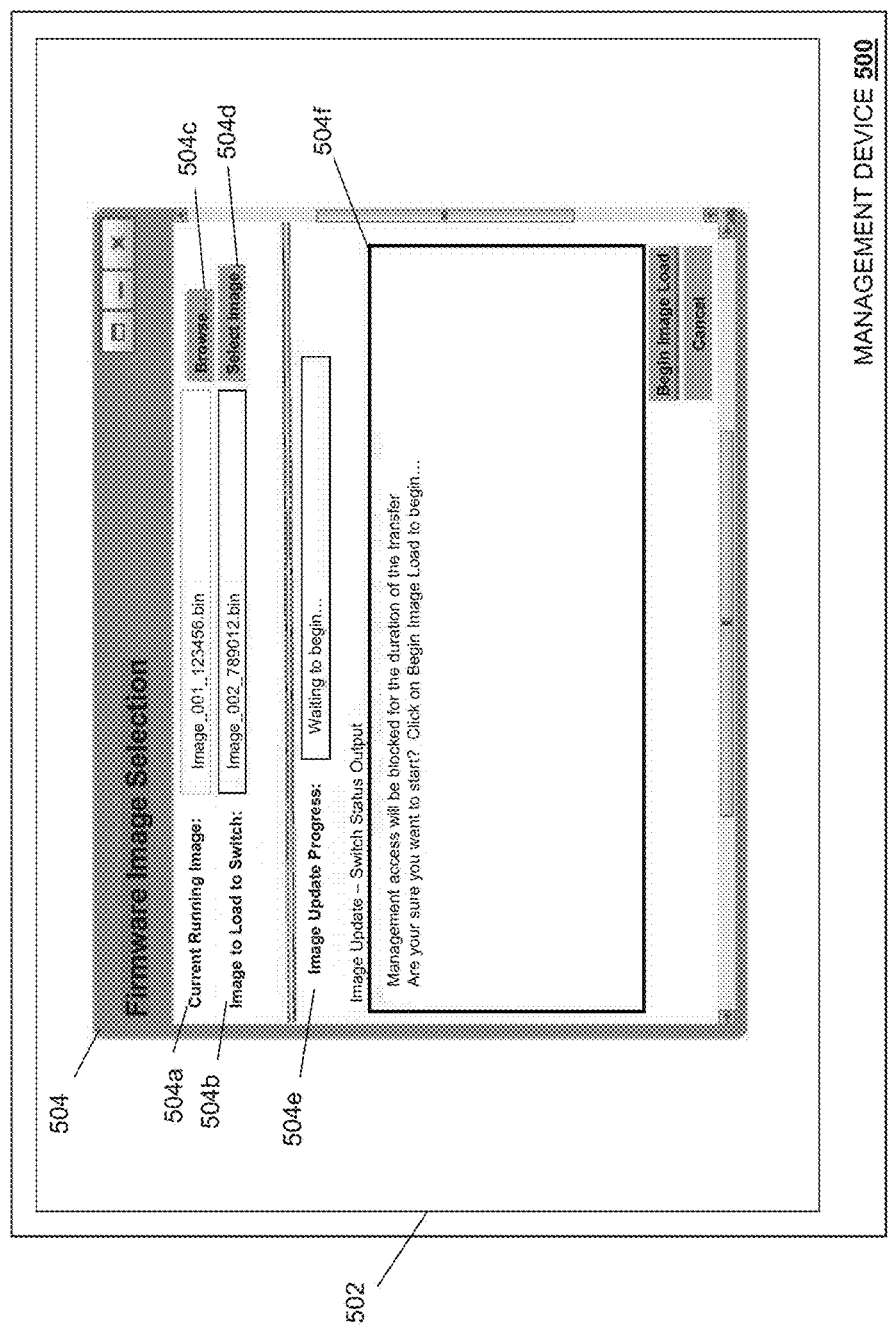
FIG. 5a is a screenshot view illustrating an embodiment of a networking device management session performed on a management device prior to a networking device reboot.

FIG. 5a illustrates an embodiment of the management device 500 providing a Graphical User Interface (GUI) runtime image selection screen 504 during the management session with the networking device 300 that is operating via the previously loaded runtime image currently running on the networking device 300 and prior to reboot of the networking device 300 (discussed below). For example, the GUI runtime image selection screen 504 provides a current running image indicator 504a that indicates the runtime image that is currently running on the networking device 300, a selected image indicator 504b that indicates a runtime image selected for loading on the networking device 300, a browse selector 504c that allows a user to review runtime images 310c available for the networking device 300, a select image selector 504d that allows the user to select the runtime image indicated in the selected image indicator 504b, and an image update progress status 504e that indicates the progress in retrieving a runtime image selected for loading on the networking device 300. The GUI runtime image selection screen 504 also includes a user information box 504f that is illustrated as providing conventional information to the user about the management session. For example, in the illustrated embodiment, the user has selected a new runtime image ("Image_002_789012.bin") to replace a currently loaded runtime image ("Image_001_123456.bin") that is currently running on the networking device 300, and is being conventionally informed in the user information box 504f that management access will be blocked for the duration of the transfer of the new runtime image, while instructing the user how to begin that transfer. As discussed below, such management access blocking is substantially eliminated in the systems and methods of the present disclosure, and as such a management session at block 402 may not include the conventional information illustrated in the user information box 504f of FIG. 5a.

Figure 5B:
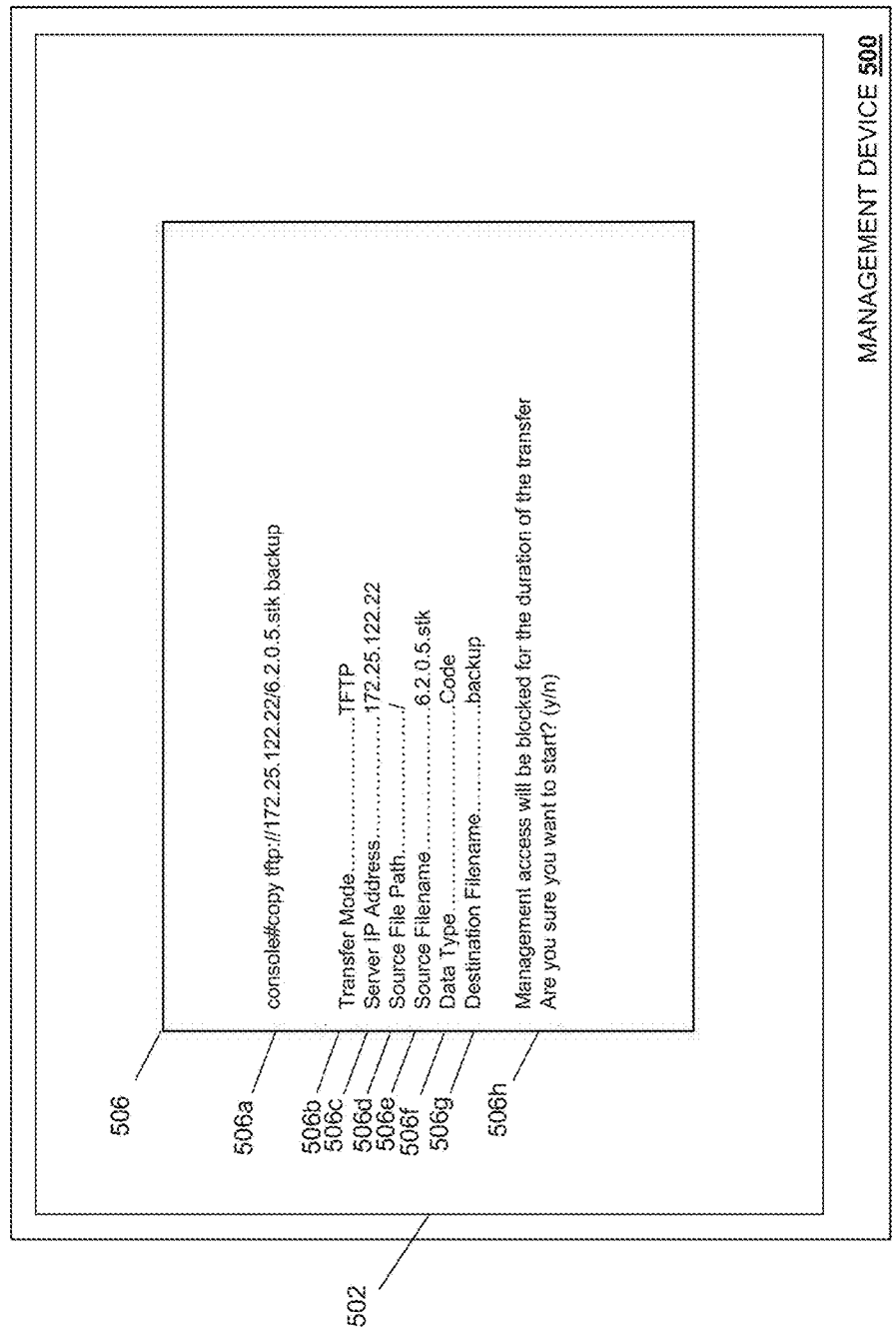
FIG. 5b is a screenshot view illustrating an embodiment of a networking device management session performed on a management device prior to a networking device reboot.

FIG. 5b illustrates an embodiment of the management device 500 providing a Command Line Interface (CLI) runtime image provisioning screen 506 during the management session with the networking device 300 that is operating via the previously loaded runtime image currently running on the networking device 300 and prior to reboot of the networking device 300 (discussed below). For example, the CLI runtime image provisioning screen 506 provides a runtime image identifier 506a that identifies a runtime image for loading on the networking device 300, along with a transfer mode 506b, server IP address 506c, source file path 506d, source filename 506e, data type 506f, and destination filename 506g that provide the transfer details of the new runtime image that selected for loading on the networking device 300. The CLI runtime image provisioning screen 506 also includes a user information line 506h that is illustrated as providing conventional information to the user about the management session. For example, in the illustrated embodiment, the user has provided a new runtime image ("6.2.0.5.stk") to replace a currently loaded runtime image that is currently running on the networking device 300, and is being conventionally informed in the user information line 506h that management access will be blocked for the duration of the transfer of the selected runtime image, while allowing the user to provide an instruction to begin that transfer. As discussed below, such management access blocking is substantially eliminated in the systems and methods of the present disclosure, and as such a management session at block 402 may not include the conventional information illustrated in the user information line 506h of FIG. 5b.

As can be seen in FIGS. 5a and 5b, in conventional systems, the user of the management device 500 is given the choice of transferring and loading the new runtime image on the networking device 300 and losing their management session/access to the networking device 300. Some conventional systems maintain the management session/access during the download of the new runtime image, but lose that management session/access during the upgrading of the networking device 300 with the new runtime image, while other conventional systems lose the management session/access as soon as the download of the new runtime image begins. In such conventional systems, once the management session/access is lost, the status of the networking device 300 "disappears" and the user of the management device must simply wait for it to "reappear" after some indeterminate amount of time, which can be substantial during the uninterruptible runtime image/firmware loading process.

Figure 6A:
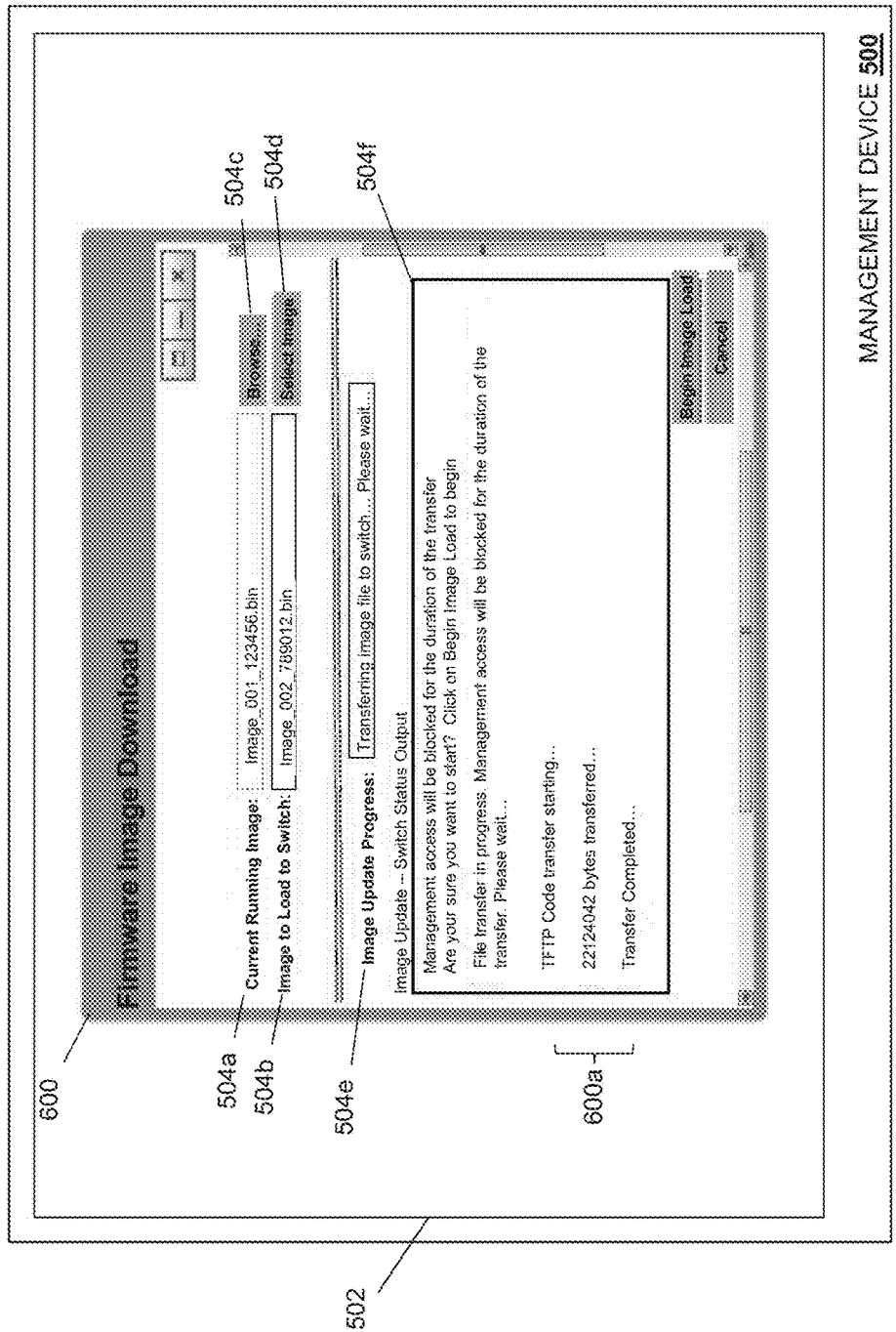
FIG. 6a is a screenshot view illustrating an embodiment of a networking device management session performed on a management device prior to a networking device reboot.

In conventional systems, once the user of the management system selects and downloads the new runtime image, they may or may not regain management access/control of the download process for a short period prior to the networking device 300 beginning the boot process. FIG. 6a illustrates an embodiment of the management device 500 providing a GUI runtime image download screen 600 during the management session with the networking device 300 that is operating via the previously loaded runtime image currently running on the networking device 300 and prior to reboot of the networking device 300 (discussed below). The GUI runtime image download screen 600 is substantially similar to the GUI runtime image selection screen 504 with the exception of the user information box 504f that is illustrated as providing conventional information to the user about the management session. For example, in the illustrated embodiment, the user is being conventionally informed in the user information box 504f of the transferring of the runtime image (and the completion of that transfer) in section 600a. Similarly, FIG. 6b illustrates an embodiment of the management device 500 providing a CLI runtime image provisioning screen 602 during the management session with the networking device 300 that is operating via the previously loaded runtime image currently running on the networking device 300 and prior to reboot of the networking device 300 (discussed below). The CLI runtime image download screen 602 is substantially similar to the CLI runtime image selection screen 504 with the exception of the provision of a user information section 602a in which the user is being conventionally informed in of the transferring of the runtime image (and the completion of that transfer).

Figure 7A:
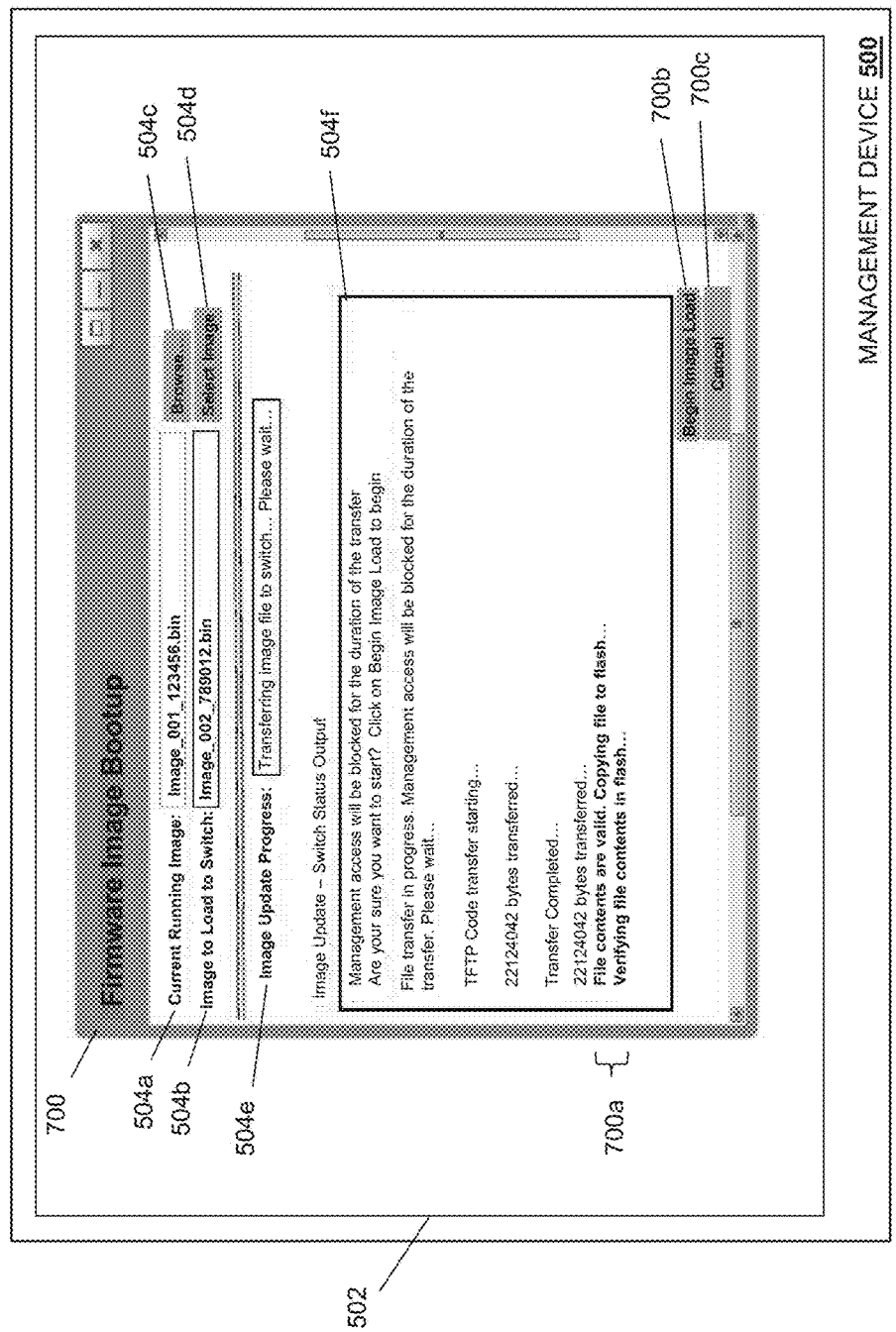
FIG. 7a is a screenshot view illustrating an embodiment of a networking device management session performed on a management device prior to a networking device reboot.
Figure 7B:
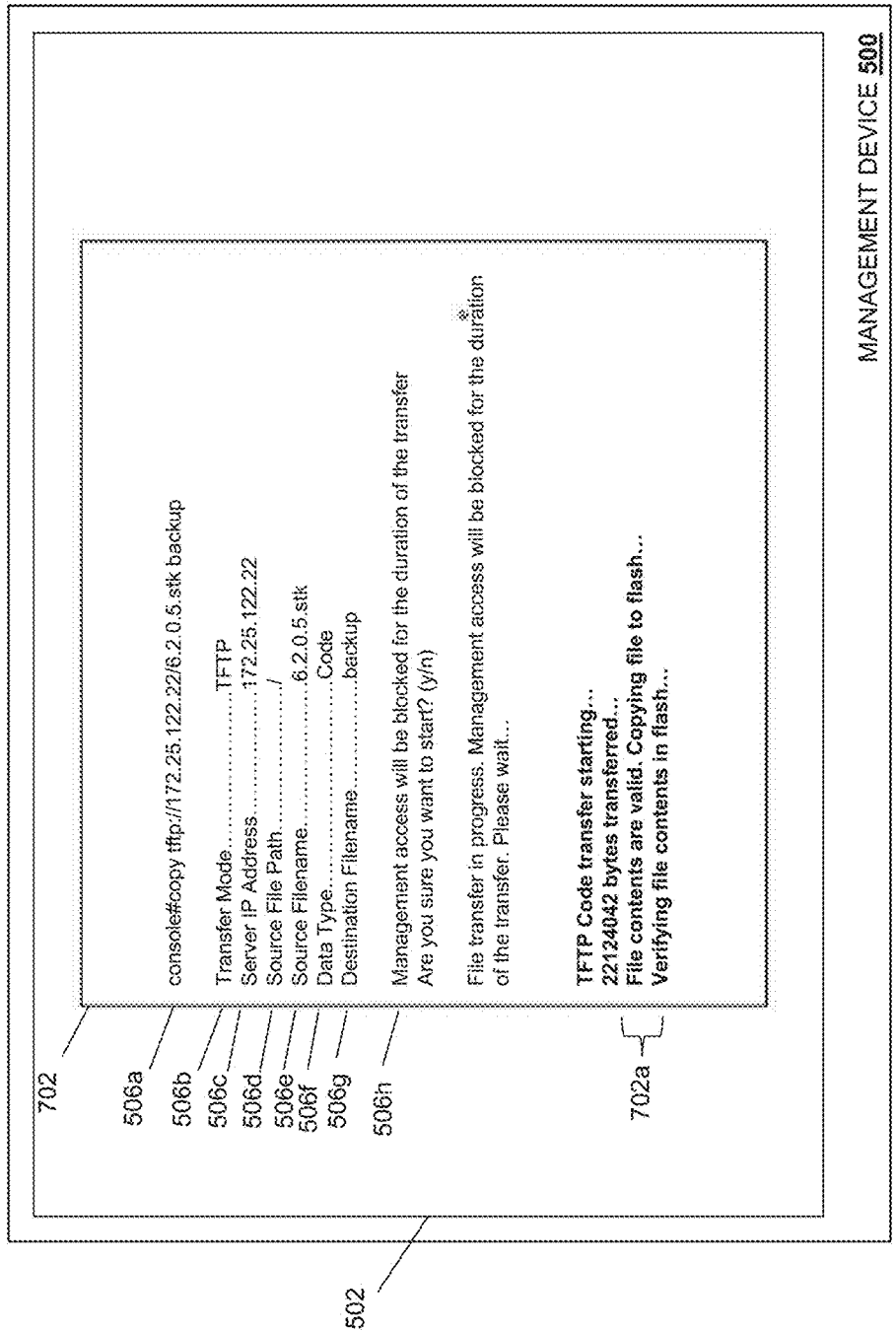
FIG. 7b is a screenshot view illustrating an embodiment of a networking device management session performed on a management device prior to a networking device reboot.

In conventional systems, the runtime image download process, which can last a substantial amount of time, results in loss of the ability to manage the networking device 300. Once the runtime image is downloaded, it is typically verified. FIG. 7a illustrates an embodiment of the management device 500 providing a GUI runtime image download screen 700 during the management session with the networking device 300 that is operating via the previously loaded runtime image currently running on the networking device 300 and prior to reboot of the networking device 300 (discussed below). The GUI runtime image download screen 700 is substantially similar to the GUI runtime image selection screen 504 with the exception of the user information box 504f that is illustrated as providing conventional information to the user about the management session. For example, in the illustrated embodiment, the user is being conventionally informed in the user information box 504f of the validity of the runtime image (and its copying to memory) in section 700a. In addition, a begin image load selector 700b and a cancel selector 700c are provided for selection by the user to either load the runtime image or cancel the process. Similarly, FIG. 7b illustrates an embodiment of the management device 500 providing a CLI runtime image download screen 702 during the management session with the networking device 300 that is operating via the previously loaded runtime image currently running on the networking device 300 and prior to reboot of the networking device 300 (discussed below). The CLI runtime image download screen 702 is substantially similar to the CLI runtime image selection screen 504 with the exception of the provision of a user information section 702a in which the user is being conventionally informed of validity of the runtime image (and its copying to memory).

In conventional systems, once the runtime image has been verified and copied to memory, the networking device 300 may begin a boot process. That boot process can take a substantial amount of time, during which management access is lost. If the boot process is successful, user communications may be reestablished such that the user can regain management access to the networking device. However, this process can take several minutes, during which time the user is provided no indicator of boot progress of any status of the networking device 300. While a check is done prior to reboot to determine if the runtime image is valid, if problems are experienced during the boot process (e.g., the boot code does not run properly), then the options are to boot the runtime image to another partition on the networking device 300 (if multiple partitions exist), or have the networking device 300 repaired. At block 402 of the method 400, prior to the reboot of the networking device 300, the management session on the management device may proceed substantially as detailed above, with the provision that there is no need to provide the conventional communications about loss of management access to the networking device 300. As such, session details such as the authentication of the user, the selection of the runtime image, and/or any other management instructions or data provided by the user through the management device 202 may be stored in the storage system 310 as the session data 310b.

The method 400 then proceeds to block 404 where the networking device performs a reboot and executes boot instructions to load an assured boot image. As discussed above, at block 404 the processing system 304 may execute the first stage boot loader instructions 308a to perform the minimal operations necessary to set up components such as memory controllers and flash access that are fixed in the networking device 300, followed by the execution of the primary boot loader instructions 308a based on parameters passed by the first stage boot loader instructions 308b to initiate the assured boot image 310a. As also discussed above, the assured boot image 310a includes minimal implementations of an operating system kernel, networking, and command interface to allow the networking device 300 to always present a boot prompt, and thus is capable of always returning the networking device 300 to a known state no matter what happens during the runtime image download and the network device boot process. As such, if the boot of the assured boot image is unsuccessful, then it can be quickly determined that the networking device 300 should be returned to the device provider for service. In an embodiment, the loading of the assured boot image 310a includes the processing system 304 in the networking device 300 executing diagnostic instructions included in the assured boot image 310a. Furthermore, because the system may boot through u-boot into the kernel, relatively little u-boot code needs to be maintained and that code is removed as a target for hackers or other unauthorized users. Finally, as discussed below, the TCP/IP and HTTP services loaded by the kernel enable the management sessions discussed below.

The method 400 then proceeds to block 406 where the management session is restarted without reauthorization to provide a restarted management session. As discussed above, session data 310b for management sessions (e.g., authentication information, management session context information, service states, management services data, protocol sessions, etc.) is stored separately from, but accessible to, the assured boot image 310a as well as the runtime images 310c, which allows for management of the networking device 300 to remain active during the runtime image download process (e.g., as illustrated in FIGS. 6a, 6b, 7a, and 7b) as well as the boot process, and allows management sessions to be handed from a previously running runtime image to a new runtime image (e.g., the runtime image selected and downloaded as discussed above). As such, at block 406, the authentication of the user that provided for the management session with the networking device 300 prior to reboot may be retrieved from the session data 310a and used to restart the management session without reauthorization at block 406. While referred to as a "restart", from a user point of view, the management session simply continues as there is little to no interruption of that management session and no authentication to enabled that management session.

Figure 8:
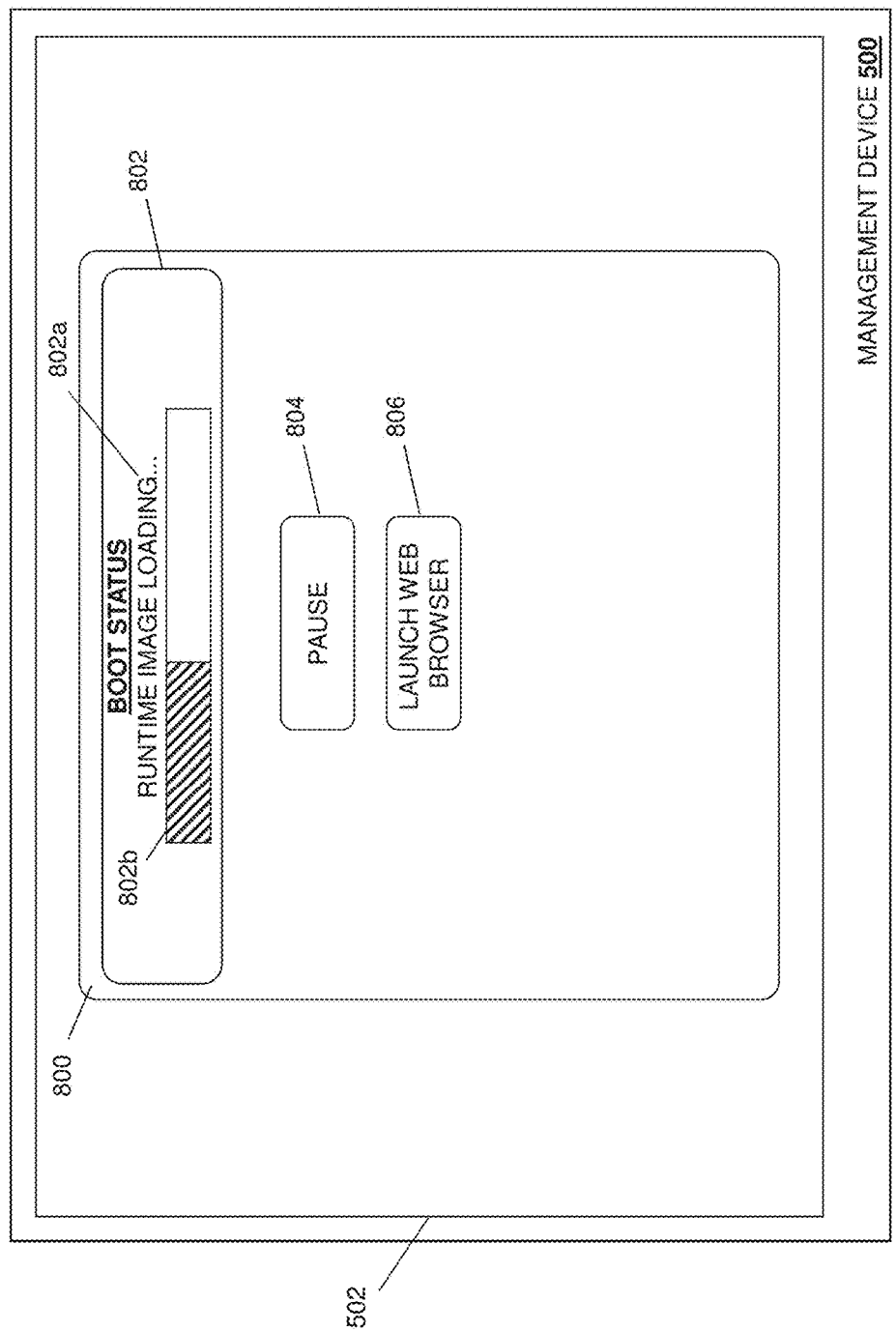
FIG. 8 is a screenshot view illustrating an embodiment of a networking device management session performed on a management device during a networking device boot process.

The method 400 then proceeds to block 408 where a Graphical User Interface (GUI) is provided on the management device during the restarted management session and prior to loading the runtime image. FIG. 8 illustrates an embodiment of the management device 500 providing a GUI runtime image boot and management screen 800 during the restarted management session with the networking device 300. In the illustrated embodiment, the GUI runtime image boot and management screen 800 includes the runtime image boot process status information 802 that includes a boot status 802a for the runtime image being booted on the networking device 300 (i.e., "RUNTIME IMAGE LOADING . . . "), and a status bar 802b that provides a graphical indication of the progress of the booting of the runtime image. Furthermore, the GUI runtime image boot and management screen 800 also includes a pause selector 804 that the user may select to, for example, pause the booting of the runtime image, and a web browser launch selector 806 that the use may select to, for example, load a web browser that allows the user to access the Internet through the network connection provided in the initial operating system environment enabled by the loading of the assured boot image 310a. While a few examples of GUI elements are illustrated in FIG. 8, one of skill in the art in possession of the present disclosure will recognize that a variety of other management functionality may be provided on the GUI runtime image boot and management screen 800 while remaining within the scope of the present disclosure.

Figure 9:
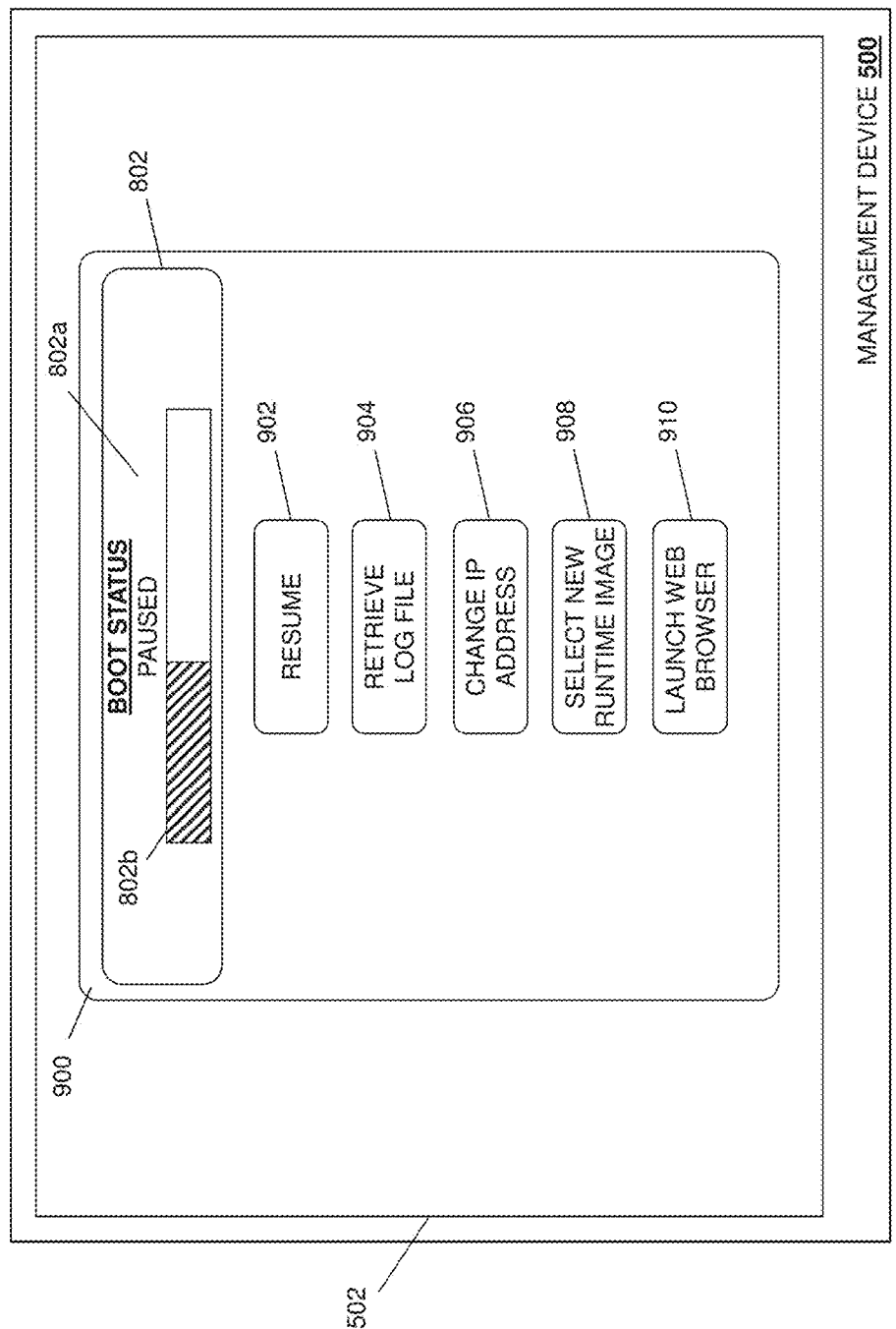
FIG. 9 is a screenshot view illustrating an embodiment of a networking device management session performed on a management device during a networking device boot process.

The method 400 then proceeds to block 410 a management instruction is received through the GUI during the restarted management session and prior to loading the runtime image, and then to block 412 where the management instruction is executed during the restarted management session and prior to loading the runtime image. Referring now to FIGS. 8 and 9, a user may provide a management instruction at block 410 by, for example, selecting the pause selector 804 on the GUI runtime image boot and management screen 800 of FIG. 8, and at block 412 that management instruction may be executed to present a GUI runtime image boot pause and management screen 900 during the restarted management session with the networking device 300. In the illustrated embodiment, the GUI runtime image boot pause and management screen 900 is similar to the GUI runtime image boot and management screen 800 in that it includes the runtime image boot process status information 802 that includes the boot status 802a for the runtime image being booted on the networking device 300 (i.e., "PAUSED" in this embodiment), and the status bar 802b that provides a graphical indication of the progress of the booting of the runtime image. However, the GUI runtime image boot pause and management screen 900 also includes a resume selector 902 that the user may select to, for example, resume the booting of the runtime image, a retrieve log file selector 904 that the user may select to, for example, retrieve a log file that details the operations performed by the networking device 300 to boot the runtime image, a change IP address selector 906 that the user may select to change an Internet Protocol address of the networking device 300, a select new runtime image selector 908 that the user may select to, for example, select a different runtime image than the runtime image that is currently being booted on the networking device 300, and a web browser launch selector 806 that the use may select to, for example, load a web browser that allows the user to access the Internet through the network connection provided in the initial operating system environment provided by the assured boot image 310a. While a few examples of GUI elements are illustrated in FIG. 9, one of skill in the art in possession of the present disclosure will recognize that a variety of other management functionality may be provided on the GUI runtime image boot and management screen 800 while remaining within the scope of the present disclosure. One of skill in the art in possession of the present disclosure will recognize that any of a variety of GUI screens may be provided that provide a variety of different management functionality (e.g., in response to selecting any of the selectors 902-910) while remaining within the scope of the present disclosure. As such, during the boot process of the runtime image on the networking device 300, the user may receive continuous feedback about that boot process while maintaining management access to the networking device 300 and the ability to conduct network communications.

Figure 10:
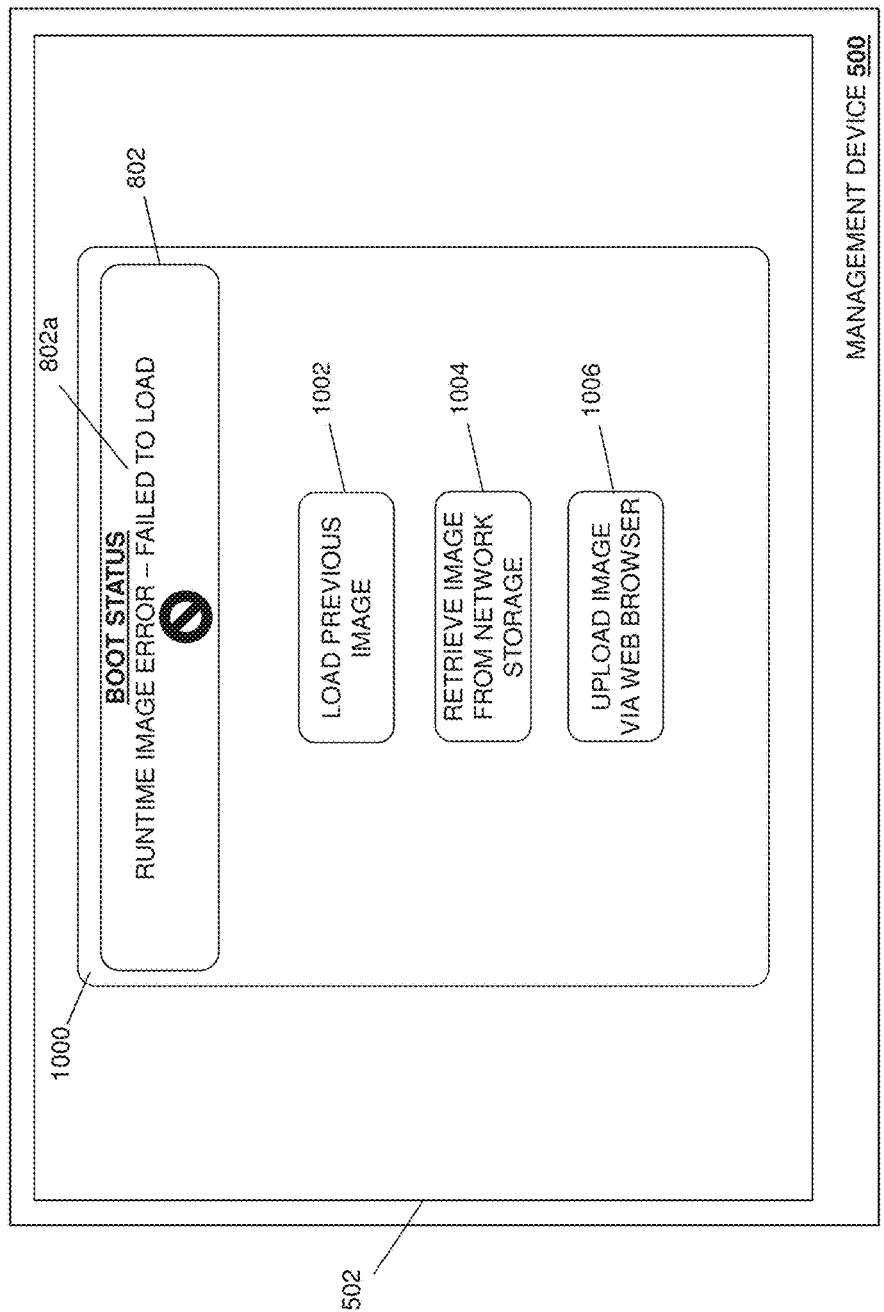
FIG. 10 is a screenshot view illustrating an embodiment of a networking device management session performed on a management device during a networking device boot process.

Referring now to FIG. 10, an embodiment of the management device 500 providing a GUI runtime image error and management screen 1000 during the restarted management session with the networking device 300. In the illustrated embodiment, the GUI runtime image error and management screen 1000 includes the runtime image boot process status information 802 that includes the boot status 802a for the runtime image being booted on the networking device 300 (i.e., "RUNTIME IMAGE ERROR—FAILED TO LOAD"). Furthermore, in response to the failure to boot the runtime image, the GUI runtime image error and management screen 1000 also includes a load previous image selector 1002 that the user may select to, for example, load the runtime image that was operating on the networking device 300 prior to the reboot, a retrieve image from network storage selector 1004 that the user may select to, for example, retrieve a runtime image via a local network connected storage system using a network connection provided by the assured boot image 310, and an upload image via web browser selector 1006 that the user may select to, for example, load a web browser that allows the user to access the Internet through the network connection provided in the initial operating system environment provided by the assured boot image 310a and select and upload a different runtime image for booting on the networking device 300. While a few examples of GUI elements are illustrated in FIG. 10, one of skill in the art in possession of the present disclosure will recognize that a variety of other management functionality may be provided on the GUI runtime image error and management screen 1000 while remaining within the scope of the present disclosure.

In other embodiments, the runtime image selected during the management session with the networking device 300 may complete the boot process successful such the networking device 300 enters a runtime state and operates to perform conventional networking functionality known in the art. Thus, systems and methods have been described that may be implemented in any networking or other embedded device to improve the quality and reliability of that device, while improving the user experiencing in bringing up and troubleshooting problems with that device. The systems and methods described herein simplify the development process by reducing the amount of work needed to replicate low level boot loader environments, while simplifying debugging and reducing costs associated with Return Material Authorizations (RMAs) for units that are actually operational. Finally, the system and methods allow the user to locally or remotely manage runtime and firmware images and monitor the boot process of a networking device through a GUI that is easy to understand and interact with.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A managed boot process system, comprising:
    a network;
    a management device that is coupled to the network; and
    a networking device that is coupled to the network and that includes:
        a storage system that includes an assured boot image, a plurality of runtime images, and a plurality of session data, wherein the assured boot image is secured in the storage system such that the assured boot image cannot be modified;
        a memory system that includes boot instructions; and
        a processing system that is configured to access the memory system to:
            store the plurality of session data in the storage system during a management session with the management device and prior to a reboot, wherein the management session is started while one of the plurality of runtime images is operating the networking device;
            perform a reboot;
            execute the boot instructions to load the assured boot image;
            restart the management session without reauthorization using the session data to provide a restarted management session that is persistent with the management session across the reboot, wherein the restarted management session is provided subsequent to loading the assured boot image and during a boot process that is performed prior to loading a runtime image;
            provide a graphical user interface over the network to the management device during the restarted management session and prior to the loading of the runtime image;
            receive a management instruction through the graphical user interface from the management device during the restarted management session and prior to the loading of the runtime image; and
            execute the management instruction during the restarted management session and prior to the loading of the runtime image.

2. The managed boot process system of claim 1, wherein the management instruction includes an instruction to load one of the plurality of runtime images.

3. The managed boot process system of claim 1, wherein processing system is configured to:
    receive authentication information for the management session with the management device prior to the reboot; and
    authenticate the authentication information and, in response, start the management session.

4. The managed boot process system of claim 1, wherein the session data includes a service state, management services data, and protocol session data saved as a snapshot.

5. The managed boot process system of claim 1, wherein the graphical user interface enables a management interface including at least one of Transmission Control Protocol/Internet Protocol (TCP/IP), Telnet, and Hyper Text Transfer Protocol (HTTP).

6. The managed boot process system of claim 1, wherein the boot instructions are configured, when executed by the processing system, to load the assured boot image directly without user interaction.

7. The managed boot process system of claim 1, wherein the assured boot image includes diagnostic instructions that are executed by the processing system in response to loading the assured boot image.

8. An information handling system (IHS), comprising:
    a processing system; and
    a memory system that is coupled to the processing system and that includes instructions that, when executed by the processing system, cause the processing system to:
        store a plurality of session data during a management session with a management device and prior to a reboot, wherein the management session is started while one of a plurality of runtime images is operating the IHS;
        perform a reboot;
        execute boot instructions to load an assured boot image that is secured in a storage system such that it cannot be modified;
        restart the management session without reauthorization using the session data to provide a restarted management session that is persistent with the management session across the reboot, wherein the restarted management session is provided subsequent to loading the assured boot image and during a boot process that is performed prior to loading one of the plurality of runtime images;
        provide a graphical user interface to the management device during the restarted management session and prior to the loading of the runtime image;
        receive a management instruction through the graphical user interface from the management device during the restarted management session and prior to the loading of the runtime image; and
        execute the management instruction during the restarted management session and prior to the loading of the runtime image.

9. The IHS of claim 8, wherein the management instruction includes an instruction to load a first runtime image.

10. The IHS of claim 8, wherein processing system is configured to:
    receive authentication information for the management session with the management device prior to the reboot; and
    authenticate the authentication information and, in response, start the management session.

11. The IHS of claim 8, wherein the graphical user interface enables a management interface including at least one of Transmission Control Protocol/Internet Protocol (TCP/IP), Telnet, and Hyper Text Transfer Protocol (HTTP).

12. The IHS of claim 8, wherein the boot instructions, when executed by the processing system, cause the processing system to load the assured boot image directly without user interaction.

13. The IHS of claim 8, wherein the assured boot image includes diagnostic instructions that are executed by the processing system in response to loading the assured boot image.

14. A method for management during a boot process, comprising:

storing, by a networking device, a plurality of session data during a management session with a management device and prior to a reboot, wherein the management session is started one of a plurality of runtime images is operating the networking device;

performing, by the networking device, a reboot;

executing, by the networking device, boot instructions to load an assured boot image, wherein the assured boot image is secured in a storage system such that it cannot be modified;

restarting, by the networking device, the management session without reauthorization using the session data to provide a restarted management session that is persistent with the management session across the reboot, wherein the restarted management session is provided subsequent to loading the assured boot image and during a boot process that is performed prior to loading a runtime image;

providing, by the networking device, a graphical user interface to the management device during the restarted management session and prior to the loading of the runtime image;

receiving, by the networking device, a management instruction through the graphical user interface from the management device during the restarted management session and prior to the loading of the runtime image; and executing, by the networking device, the management instructions during the restarted management session and prior to the loading of the runtime image.

15. The method of claim 14, wherein the management instruction includes an instruction to load a first runtime image.

16. The method of claim 14, further comprising:

receiving, by the networking device, authentication information for the management session with the management device prior to the reboot; and authenticating, by the network device, the authentication information and, in response, start the management session.

17. The method of claim 14, wherein the session data includes a service state, management services data, and protocol session data saved as a snapshot.

18. The method of claim 14, wherein the graphical user interface enables a management interface including at least one of Transmission Control Protocol/Internet Protocol (TCP/IP), Telnet, and Hyper Text Transfer Protocol (HTTP).

19. The method of claim 14, wherein the boot instructions, when executed by a processing system included with the networking device, cause the processing system to load the assured boot image directly without user interaction.

20. The method of claim 14, wherein the assured boot image includes diagnostic instructions that are executed by a processing system in response to loading the assured boot image.

\* \* \* \* \*